Patented Jan. 4, 1944

2,338,568

UNITED STATES PATENT OFFICE 2,338,568

ISOMERIZATION OF PARAFFINIC HYDROCARBONS

Jeffrey H. Bartlett, Cranford, N. J., assignor to Standard Oil Development Company, a corporation of Delaware No Drawing. Application November 3, 1939, Serial No. 302,673

6 Claims. (Cl. 260—683.5)

The present invention relates to an improved method for isomerizing normal and straight chain paraffin hydrocarbons, and more specifically to a new class of catalyst activators for the said reaction. The process will be understood from the following description.

It is known that normal paraffin hydrocarbons can be isomerized by means of Friedel-Crafts catalysts such as aluminum chloride or bromide, zinc halides or ferric chloride. It is likewise known that the catalyst in almost every case requires an activator in the absence of which its activity diminishes very rapidly. As activators, hydrogen halides, such as hydrogen chloride, have been mainly employed although they are quite corrosive and undesirable for this reason.

It has now been found that the low molecular weight aliphatic alcohols and the ethers prepared therefrom are excellent catalyst activators and that they have marked advantage over the hydrogen halides in that they are non-corrosive. The best activators are those alcohols of less than four carbon atoms to the molecule, specifically methyl alcohol, ethyl alcohol, propyl and isopropyl alcohols, as well as ethers prepared therefrom. Not only may the simple ethers such as methyl, ethyl and propyl ether be employed, but also mixed ethers such as methyl-ethyl ether, methyl-propyl or ethyl-isopropyl ethers. These activators may be added to the feed stock or they may be independently introduced into the reaction chamber, the particular method not being of primary consequence since it is only necessary that the alcohol be present when the normal paraffin is brought into contact with the isomerizing catalyst and remains present during the reaction.

The reaction may be carried out in batch, for example, in a bomb or autoclave, preferably fitted with agitating apparatus, but continuous flow processes are preferred in which the normal paraffin is passed in vapor or liquid condition through a reaction vessel containing the catalyst which may be in lump or powder form and may be supported on a carrier such as silica, alumina gels, activated carbon, asbestos, pumice, clay and the like. The hydrocarbon feed stock may be pumped through a horizontal chamber or vertical bed of the catalyst. The catalysts may consist entirely of Freidel-Crafts agents or may be modified by addition of alkali or alkaline earth halides such as potassium or sodium chloride or calcium or magnesium halides.

The low molecular weight alcohol or ether in such a process may be added to the feed stock, or it may be added to the reaction chamber by independent means so as to be distributed more evenly through the catalyst mass. It is not necessary to add the activator continuously and it may be added from time to time as the catalyst shows deterioration. The amount of the activator varies with the catalyst, its age and the temperature and other conditions but ordinarily the amount is from ½ to 5 or 10% of the feed stock treated.

The isomerized product is withdrawn from the apparatus and separated by distillation from the unconverted hydrocarbons, which may be recirculated for further reaction. The activator may likewise be separated and reused.

The conditions for isomerizing with the present catalysts and activators are much the same as those formerly employed with the halo acid activators. A wide temperature range may be employed, for example, from room temperature to about 400° F. The upper end, that is 300 to 400° F., is preferably employed when the feed stocks are in vapor phase and there may be some decomposition at the same time. At the lower temperatures, say from 70 to 250° F., isomerization may be effected without side reactions. The time of the reaction varies with other factors, such as temperature, the amount of catalyst, the particular catalyst and the particular feed stock. In general, however, the time of reaction may be from ½ to 30 hours and the conditions are usually adjusted so as to obtain a conversion of 50 to 75% at a temperature of 150 to 250° F. for butane and 75 to 125° F. for pentane. For such conditions, the amount of the catalyst in a batch process would be about equal to the hydrocarbon to be converted and the amount of the catalyst activator should be from about 0.5 to 10% of the hydrocarbon used. In a continuous flow process, a feed rate of 0.05 to 1.0 volume of liquid per volume of catalyst per hour could be used under the same temperature conditions as mentioned above while employing 1 to 20% activator based on AlCl₃. In order to better understand the process, the following example is given:

*Example.*—N-pentane was used as the feed stock in all of the following which were carried out in batch, using 50% by weight of aluminum chloride based on the N-pentane. The temperature in each case was from 70 to 80° F., and the time of reaction about 20 hours. After the reaction the product was carefully analyzed to show the amount of butane (essentially isobutane), of isopentane and of normal pentane plus heavier.

| Activator | Percent of activator by weight | | Product analysis | | |
|---|---|---|---|---|---|
| | Based on N-pentane | Based on AlCl₃ | Butane | Isopentane | N-pentane + heavier |
| | Percent | Percent | Percent | Percent | Percent |
| Methyl alcohol | 1 | 2 | 8 | 46 | 49 |
| Do | 5 | 10 | 15 | 35 | 50 |
| Ethyl alcohol | 1.44 | 2.88 | 17 | 34 | 49 |
| Isopropyl alcohol | 1.88 | 3.76 | 17 | 26 | 57 |
| Secondary butyl alcohol | 2.32 | 4.64 | 15 | 34 | 51 |
| Diethyl ether | 2.32 | 4.64 | 15 | 34 | 51 |

The above mentioned catalyst activator combination is specifically claimed herein for the purpose of catalytic isomerization of normal paraffins, but it is found that under suitable conditions it may be used for other reactions, for example, aliphatic hydrocarbons may be cyclized advantageously with the above mentioned catalyst under the known temperature conditions. The same catalyst activator combination is useful in effecting cracking reactions and also for alkylation of aromatics, naphthenes with olefins or alkyl halides, and also for the alkylation of isoparaffins with normal or iso-olefins.

The present invention is not to be limited by any theory of the reaction mechanism or the mechanism of activation.

I claim:

1. In a process for isomerizing normal paraffins of at least four carbon atoms per molecule with Friedel-Crafts type catalysts under isomerization reaction conditions, the improvement comprising conducting the reaction by adding thereto an aliphatic ether prepared from aliphatic alcohols of less than four carbon atoms per molecule.

2. A process according to claim 1 in which the catalyst is an aluminum halide.

3. A process according to claim 1 in which the catalyst is aluminum chloride.

4. An improved process for isomerizing normal paraffins of at least four carbon atoms per molecule to the corresponding isoparaffins which comprises subjecting said normal paraffins to the action of a Friedel-Crafts type catalyst while activating the reaction by adding thereto aliphatic ether of an alcohol of less than four carbon atoms per molecule and maintaining a reaction temperature between about 50° F. and about 400° F.

5. A process according to claim 4 in which the catalyst is aluminum chloride and the activator diethyl ether.

6. A process according to claim 4 in which the catalyst is aluminum chloride and the activator diethyl ether present between about 0.5% and about 10% by weight of the normal paraffin.

JEFFREY H. BARTLETT.